(12) United States Patent
Bennett et al.

(10) Patent No.: US 9,147,062 B2
(45) Date of Patent: Sep. 29, 2015

(54) RENEWAL OF USER IDENTIFICATION INFORMATION

(75) Inventors: Paul W. Bennett, Round Rock, TX (US); Christopher M. Dettlaff, Apex, NC (US); Elisa Ferracane, Austin, TX (US); William J. O'Donnell, Fichburg, WI (US); Michael C. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 13/172,699

(22) Filed: Jun. 29, 2011

(65) Prior Publication Data

US 2013/0007856 A1 Jan. 3, 2013

(51) Int. Cl.
*H04L 9/00* (2006.01)
*G06F 21/33* (2013.01)

(52) U.S. Cl.
CPC ...................................... *G06F 21/33* (2013.01)

(58) Field of Classification Search
None
See application file for complete search history.

(56) References Cited

U.S. PATENT DOCUMENTS

| 7,657,531 | B2 | 2/2010 | Bisbee et al. |
| 7,703,128 | B2 | 4/2010 | Cross et al. |
| 2006/0117015 | A1 | 6/2006 | Bisbee et al. |
| 2007/0118886 | A1* | 5/2007 | Martin ............................... 726/5 |
| 2010/0142711 | A1* | 6/2010 | Weis et al. ..................... 380/277 |
| 2012/0060210 | A1* | 3/2012 | Baker et al. ........................ 726/9 |

FOREIGN PATENT DOCUMENTS

CN 101355809 A 1/2009

OTHER PUBLICATIONS

Jain, "Method and System for Automatically Verifying an Appropriate Use of a Security Token for Avoiding Cross Site Request Forgery (CSRF) Attacks", Jan. 20, 2011, 5 pages.
Saint-Andre, et al., Representation and Verification of Domain-Based Application Service Identity within Internet Public Key Infrastructure Using X.509 (PKIX) Certificates in the Context of Transport Layer Security (TLS) (RFC6125), Mar. 1, 2011, 115 pages.

* cited by examiner

*Primary Examiner* — Joseph P Hirl
*Assistant Examiner* — Leynna Truvan
(74) *Attorney, Agent, or Firm* — Jeffrey S. LaBaw; David H. Judson

(57) ABSTRACT

A method, data processing system, and computer program product for managing user identification information. A determination is made whether an instance of security information in use on the first application server and referenced by a token that has expired was generated by an application server compatible with a first application server in response to receiving the token. A determination is made whether the instance of the security information is managed by a set of rules for a group of users of the first application server. A determination is made whether a user identifier from the token is authorized to access the first application server. The token is renewed in response to determining that the user identifier is authorized to access the first application server.

25 Claims, 7 Drawing Sheets

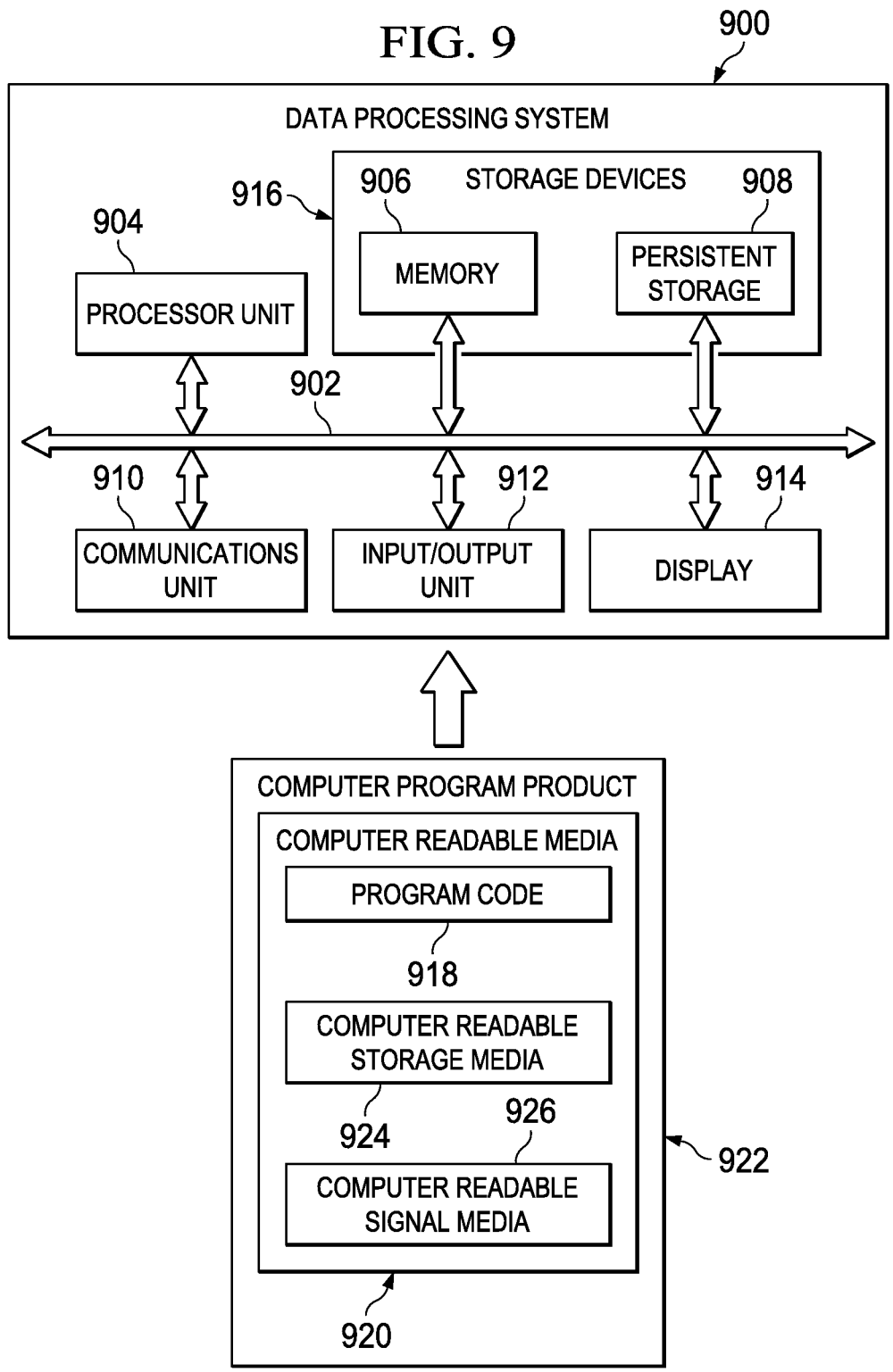

RENEWAL OF USER IDENTIFICATION INFORMATION

BACKGROUND

1. Field

The present disclosure relates generally to network data processing systems and more specifically to application servers. Still more particularly, the present disclosure relates to renewal of user identification information at an application server.

2. Description of the Related Art

An application server is a software framework that provides an environment for a client device to use an application. The client device can access the application server over a network connection. The client device may be able to use the application to perform a transaction regardless of the location of the client.

The application server can be implemented on a number of different hardware devices. For example, the application server may consist of several server computers at different locations. Different parts of a transaction may be performed by different server computers. In order to maintain security and track a user's transaction, the application server may require the user to authenticate. For example, the user may enter a user identifier and password. The application server then creates a representation of the user from information about the user. The application server uses the representation of the user to associate the user with the transaction. The application server maintains the representation of the user for the duration of the transaction. The representation of the user can be passed to the different server computers that perform the transaction.

Additionally, when the user authenticates to the application server, the application server may return a token to the user's device. When the user's device sends a request to the application server, the user's device includes the token in the request. The token allows the server computer that receives the request to identify the user without requiring the user to re-authenticate. The token allows the user to remain logged in to more than one server computer. The user has been authenticated to the application server. Thus, even though the application server may consist of several server computers at different locations, the application server appears to the user as a single server computer.

However, if an unauthorized user gains access to the user's device, the unauthorized user may be able to use the token to access the application server. Additionally, the information about the user may change over time. Thus, the representation of the user maintained at the application server may be inaccurate.

Accordingly, it would be advantageous to have a method and apparatus, which takes into account one or more of the issues discussed above as well as possibly other issues.

SUMMARY

According to one embodiment of the present disclosure, the different illustrative embodiments provide a method, data processing system, and computer program product for managing user identification information. A determination is made whether an instance of security information in use on the first application server and referenced by a token that has expired was generated by an application server compatible with a first application server in response to receiving the token at the first application server. A determination is made whether the instance of the security information is managed by a set of rules for a group of users of the first application server in response to determining that the instance of the security information was generated by an application server compatible with the first application server. A determination is made whether a user identifier from the token is authorized to access the first application server in response to determining that the instance of the security information referenced by the token is managed by the set of rules for the group of users of the first application server. The token is renewed in response to determining that the user identifier is authorized to access the first application server.

BRIEF DESCRIPTION OF THE SEVERAL VIEWS OF THE DRAWINGS

FIG. 9 is an illustration of a data processing system in accordance with an illustrative embodiment.

DETAILED DESCRIPTION

Figure 1:
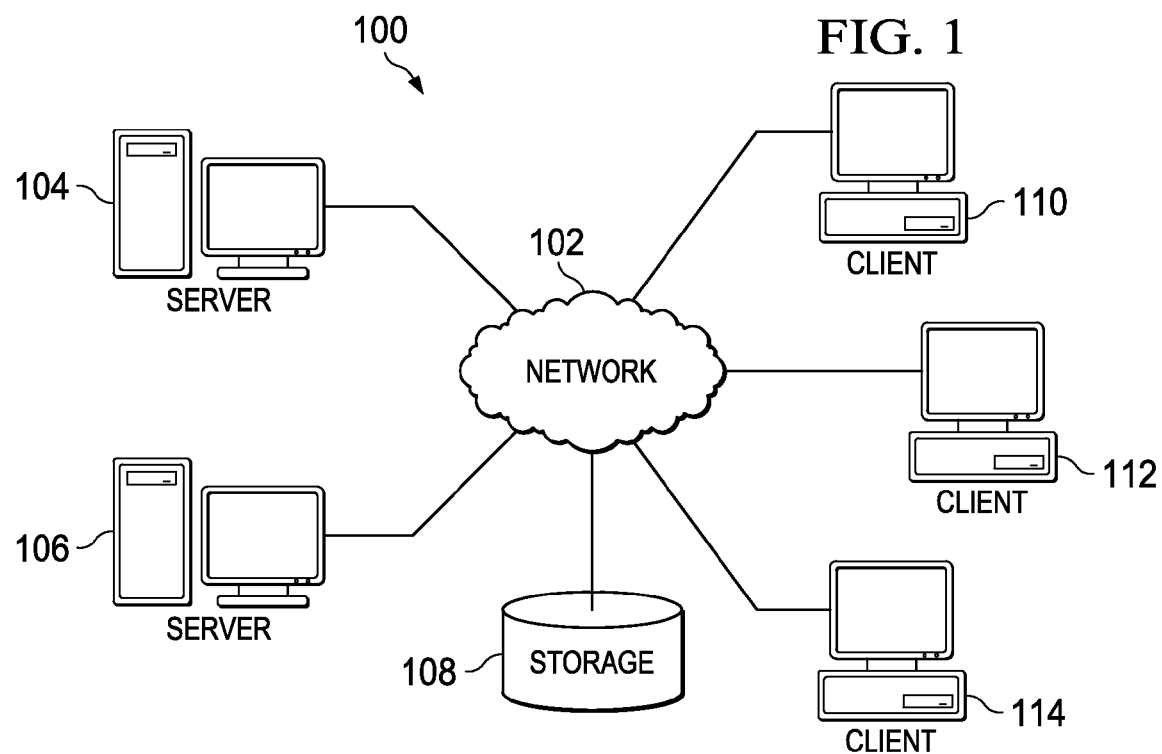
FIG. 1 is an illustration of a network of data processing systems in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages.

In these illustrative examples, an application server may be implemented on server computer 104 and/or server computer 106. The application server may provide any one of client computers 110, 112, and 114 access to applications running on server computer 104 and/or server computer 106 over network 102. In one example, the application server may be a web server where requests are exchanged using the Transmission Control Protocol/Internet Protocol suite of protocols. The web server can provide any one of client computers 110, 112, and 114 to the applications through a web browser running on client computers 110, 112, and 114.

Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The different illustrative embodiments recognize and take into account a number of different considerations. For example, the different illustrative embodiments recognize and take into account that it may be desirable for a user to use an application server without needing to consistently re-authenticate. For example, re-authenticating may waste a user's time. Additionally, transactions being processed for the user may be delayed while the user is re-authenticating.

The different illustrative embodiments recognize that one solution may involve sending a token to a client computer being used by the user. The token will allow the user to remain authenticated to the application server. However, the different illustrative embodiments recognize that if an unauthorized user gains access to the client computer, the unauthorized user may be able to use the token to access the application server. The different illustrative embodiments further recognize that to prevent unauthorized users from accessing the application server, tokens may expire after a period of time. Thus, the user may have to re-authenticate after the period of time.

The different illustrative embodiments further recognize and take into account that information about the user may change over time. Thus, the representation of the user maintained at the application server may be inaccurate. For example, a user may initially be permitted to perform a certain transaction. However, during the course of performance of the certain transaction the permissions of the user may change. The inconsistency between the representation of the user and the permissions of the user may cause errors or allow the certain transaction to be performed.

Thus, the different illustrative embodiments provide a method, data processing system, and computer program product for managing user identification information. A determination is made whether an instance of security information in use on the first application server and referenced by a token that has expired was generated by an application server compatible with a first application server in response to receiving the token at the first application server. A determination is made whether the instance of the security information is managed by a set of rules for a group of users of the first application server in response to determining that the instance of the security information was generated by an application server compatible with the first application server. A determination is made whether a user identifier from the token is authorized to access the first application server in response to determining that the instance of the security information referenced by the token is managed by the set of rules for the group of users of the first application server. The token is renewed in response to determining that the user identifier is authorized to access the first application server. A "set", as used herein with reference to an item, means one or more items.

Figure 2:
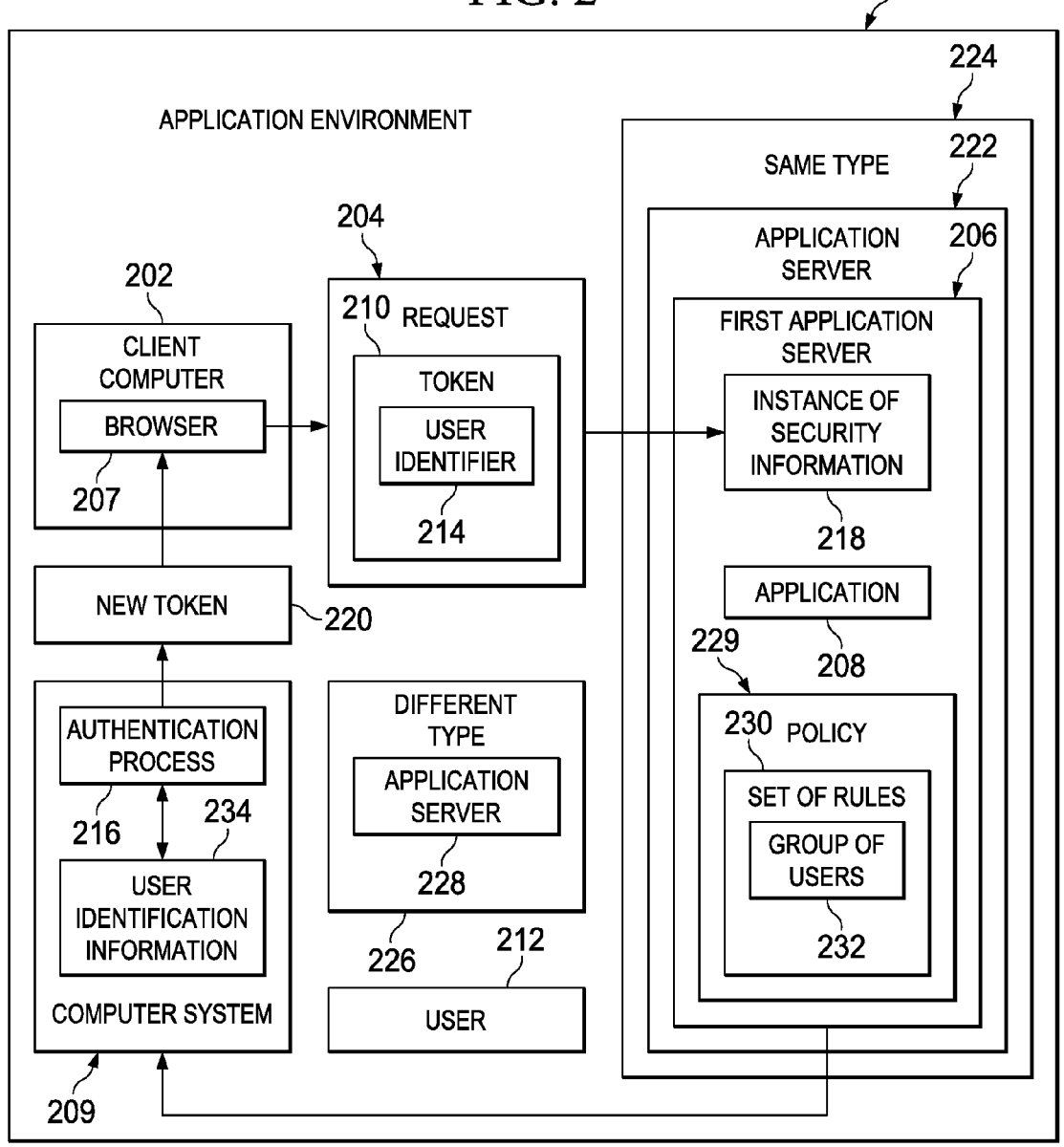
FIG. 2 is a block diagram of an application environment in accordance with an illustrative embodiment.

With reference now to FIG. 2, a block diagram of an application environment is depicted in accordance with an illustrative embodiment. In this illustrative embodiment. Application environment 200 is an environment in which illustrative embodiments may be implemented. For example, network data processing system 100 in FIG. 1 may be implemented in application environment 200.

In application environment 200, client computer 202 sends request 204 to first application server 206. In these examples, first application server 206 is software that provides an environment for client computer 202 to use application 208. For example, without limitation, first application server 206 may be a WebSphere® application server, an Apache web server, and or any other type or application server. First application server 206 runs on computer system 209. Computer system 209 is one or more computers. Computer system 209 includes hardware for running first application server 206.

In this illustrative example, browser 207 sends request 204 to first application server 206. Browser 207 is an application on client computer 202 for sending information to another computer over a network connection. For example, browser 207 may be a web browser. Request 204 is a message to first application server 206 to use application 208.

In this illustrative example, request 204 includes token 210. Token 210 is information about user 212 of client computer 202 used to identify user 212 to first application server 206. For example, without limitation, token 210 may be a security token, a cookie, a security assertion markup language (SAML) assertion, a Kerberos protocol message, a lightweight third-party authentication (LTPA) token, and/or any other type of information for identifying a user to an application server.

For example, when user 212 desires to access first application server 206, authentication process 216 may require user 212 to supply user identifier 214 and a password. When user 212 has been authenticated, authentication process 216 sends token 210 to browser 207 of client computer 202. First application server 206 uses token 210 from request 204 to identify user 212 of client computer 202. For example, token 210 contains user identifier 214. User identifier 214 is any combination of numbers, letters, and/or characters for uniquely identifying user 212 to first application server 206. In this manner, token 210 allows user 212 to remain logged into first application server 206 for a period of time. Additionally, since request 204 includes user identifier 214 first application server 206 may not have to track user 212.

For example, when user 212 was authenticated, authentication process 216 generated instance of security information 218 about user 212. Instance of security information 218 is a data object containing security information about user 212. For example, without limitation, instance of security information 218 may contain user identifier 214, credentials, passwords, privileges, groups, permissions, and/or any other information about user 212. Instance of security information 218 is maintained at first application server 206. For example, instance of security information 218 is a representation of user 212 to first application server 206. In one illustrative example, instance of security information 218 may be called a subject in Java™ programming language.

In this illustrative example, token 210 has expired. For example, token 210 may have been issued to be valid for a period of time. When token 210 is retrieved at first application server 206, authentication process 216 will check token 210 to determine whether token 210 is still valid. Since, in this example, token 210 has expired, request 204 may be denied. User 212 may then have to re-authenticate in order to receive new token 220.

However, the different illustrative embodiments provide the possibility for token 210 to be renewed without user 212 having to re-authenticate. After receiving token 210, authentication process 216 identifies instance of security information 218 referenced by token 210. For example, authentication process 216 may identify instance of security information 218 by matching user identifier 214 from token 210 with user identifier 214 in instance of security information 218.

Authentication process 216 determines whether instance of security information 218 was generated by an application server that is compatible with first application server 206. An application server is compatible with another application server if the application server can use instances of security information generated by the other application server. In one example, application servers may be compatible if the applications servers are a same type or have a same version number. For example, if instance of security information 218 was generated by same type 224 of application server 222 as first application server 206, application server 222 may be compatible with first application server 206. However, if instance of security information 218 was generated by different type 226 of application server 228 as first application server 206, application server 228 may not be compatible with first application server 206.

In one example, instance of security information 218 may have been generated by first application server 206. Thus, instance of security information 218 was generated by an application server that is compatible with first application server 206. In another example, authentication process 216 may check whether a version of the application server that generated instance of security information 218 is the same as first application server 206. If the application server that generated instance of security information 218 is not compatible with first application server 206, authentication process 216 will not renew token 210.

In other examples, compatibility could be one way. For example, one application server may be able to use an instance of security information generated by another application server, while the other application server may not be able to use an instance of security information generated by the one application server.

In determining whether to renew token 210, authentication process 216 also determines whether instance of security information 218 is managed by policy 229. Policy 229 is set of rules 230 of group of users 232 of first application server 206. In these examples, policy 229 including set of rules 230 of group of users 232 defines access procedures and capabilities of group of users 232 for use of resources within first application server 206. For example, set of rules 230 of group of users 232 includes rules regarding naming conventions used in first application server 206. In one example, set of rules 230 of group of users 232 is a security realm of first application server 206.

In determining whether instance of security information 218 is managed by set of rules 230 of group of users 232, authentication process 216 may determine whether a set of rules of a group of users used in instance of security information 218 is the same as set of rules 230 of group of users 232 of first application server 206. If instance of security information 218 is not managed by set of rules 230 of group of users 232, authentication process 216 will not renew token 210.

In determining whether to renew token 210, authentication process 216 also checks user identification information 234 to determine whether user identifier 214 is still valid. For example, authentication process 216 checks whether user identifier 214 has been revoked and whether user identifier 214 is still permitted to access first application server 206. If user identifier 214 is not valid, authentication process 216 will not renew token 210.

On the other hand, if user identifier 214 is still valid, authentication process 216 will allow request 204 to be performed at first application server 206 despite token 210 being expired. Additionally, authentication process 216 will renew token 210 by generating new token 220. New token 220 is similar to token 210. However, new token 220 is valid for a present time. For example, new token 220 is not expired. Authentication process 216 sends new token 220 to browser 207. Browser 207 can use new token 220 in future requests sent to first application server 206.

The illustration of application environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, first application server 206 may be more than one application server running on different server computers located in different locations. Instance of security information 218 may be a copy of security information about user 212 copied from a different server computer than the server computer running first application server 206.

In other illustrative embodiments, authentication process 216 may be part of first application server 206. In yet other illustrative embodiments, user identification information 234 may be stored in a database located on a same server computer as first application server 206. In still other illustrative embodiments, authentication process 216 and user identification information 234 may be located remotely from first application server 206.

Figure 3:
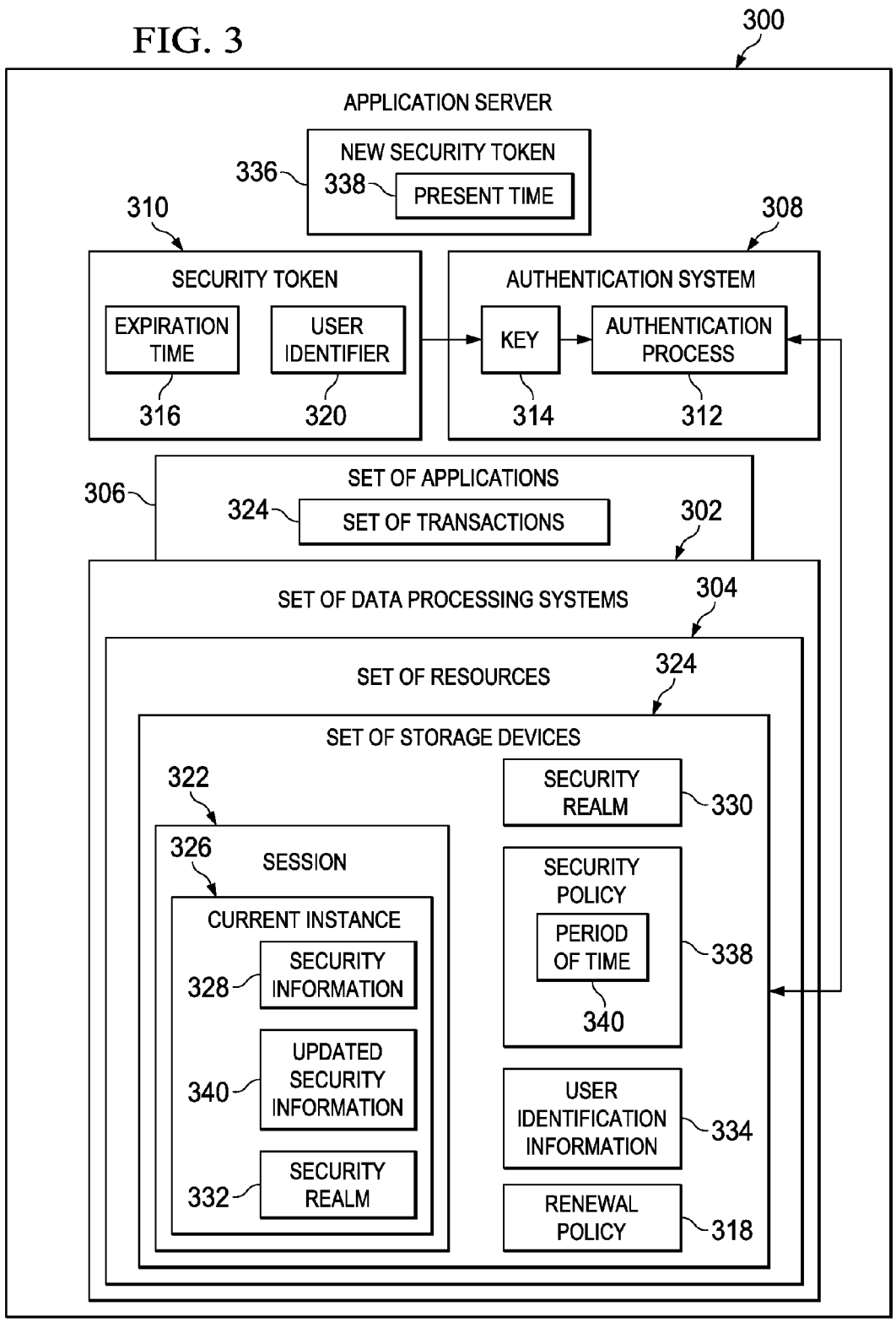
FIG. 3 is a block diagram of an application server in accordance with an illustrative embodiment.

With reference now to FIG. 3, a block diagram of an application server is depicted in accordance with an illustrative embodiment. In these illustrative examples, application server 300 is an example of one embodiment of first application server 206 in FIG. 2.

In this illustrative example, application server 300 is running on set of data processing systems 302. Application server 300 uses set of resources 304 in set of data processing systems 302. Set of resources 304 may include processor resources, network resources, and/or storage resources. For example, set of applications 306 in application server 300 may run on set of resources 304. Set of applications 306 uses set of resources 304 to perform transactions.

Application server 300 includes authentication system 308. Authentication system 308 is hardware and/or software for determining whether to renew security token 310 after security token 310 expires. Security token 310 is an example of one implementation of token 210 in FIG. 2.

Authentication system 308 is associated with set of data processing systems 302. A first component may be considered to be associated with a second component by being connected to the second component in some suitable manner. The first component also may be connected to the second component through using a third component. The first component may also be considered to be associated with the second component by being formed as part of and/or an extension of the second component. For example, authentication system 308 may use resources in set of resources 304 to perform tasks.

In this example, security token 310 is encrypted when received by authentication system 308. Authentication process 312 in authentication system 308 uses key 314 to decrypt security token 310. Authentication process 312 compares expiration time 316 with a present time. If the present time is after expiration time 316, authentication process 312 determines that security token 310 has expired. Authentication process 312 searches renewal policy 318 to determine whether renewal of security token 310 is permitted in application server 300. For example, an administrator of application server 300 may determine whether security tokens may be renewed. For example, the administrator may set a property to control "verifyUser" to "true" in renewal policy 318.

Authentication process 312 uses user identifier 320 to locate session 322 stored in set of storage devices 324. Session 322 is information about set of transactions 324 being processed by set of applications 306 for user identifier 320. Session 322 includes current instance 326 of security information 328 for user identifier 320. For example, current instance 326 of security information 328 may be a subject of user identifier 320 maintained at application server 300. Multiple instances of security information 328 may exist in application server 300. For example, a different instance of security information 328 may exist on different data processing systems in set of data processing systems 302. Current instance 326 may be an instance of security information 328 on a data processing system in set of data processing systems 302 where security token 310 was received. Current instance 326 may be an instance of security information 328 on a data processing system in set of data processing systems 302 where an application in set of applications 306 performing a transaction related to security token 310 is running.

Authentication process 312 determines whether security information 328 was generated by a same type of application server as application server 300. Security information 328 was generated when session 322 began. Session 322 may run for a long period of time with different transactions performed by different application servers. Authentication process 312 determines whether security information 328 was generated by an application server that is compatible with application server 300. For example, in one illustrative embodiment, application server 300 may be implemented using a WebSphere® application server. Authentication process 312 checks whether security information 328 was generated by a WebSphere® application server as opposed to a different type of application server.

Authentication process 312 also identifies security realm 330 of application server 300. Authentication process 312 determines whether security realm 332 used in current instance 326 of security information 328 matches security realm 330 of application server 300.

Authentication process 312 attempts to retrieve user identification information 334 for user identifier 320. User identification information 334 includes permission information and credential information about user identifier 320. Authentication process 312 determines from user identification information 334 whether user identifier 320 is still valid and authorized to access application server 300. For example, if no user identification information for user identifier 320 is located in user identification information 334, user identifier 320 is not valid. In another example, user identification information 334 may specify that user identifier 320 is not authorized to access application server 300.

If user identifier 320 is still valid and authorized to access application server 300, authentication process 312 renews security token 310. Authentication process 312 renews security token 310 by generating new security token 336. Authentication process 312 accesses security policy 338 to determine period of time 340 new security token 336 is valid. For example, period of time 340 new security token 336 is valid may be selected by an administrator. Authentication process 312 includes present time 338 as a time that new security token 336 is valid. Additionally, new security token 336 may be valid from present time 338 until an end of period of time 340. Authentication process 312 encrypts new security token 336 using key 314. Authentication process 312 sends new security token 336 to a browser that security token 310 was received from.

Additionally, authentication process 312 searches user identification information 334 to determine whether information in security information 328 has changed. For example, credentials and/or permissions for user identifier 320 may have changed since session 322 began. If information in security information 328 has changed, authentication process 312 stores updated security information 340 for session 322. For example, authentication process 312 may generate a new subject for user identifier 320 using updated security information 340.

The illustration of application server 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, application server 300 may be implemented as a virtual machine running on set of data processing systems 302. In another example, application server 300 may be a thin client providing a client device with access to storage resources in set of storage devices 324.

In some illustrative embodiments, the information for session 322 may be stored in volatile memory in one or more data processing systems in set of data processing systems 302. In other illustrative embodiments, portions of the information for session 322 may have been stored to a disk in one or more data processing systems in set of data processing systems 302.

Figures 4, 5, 6:
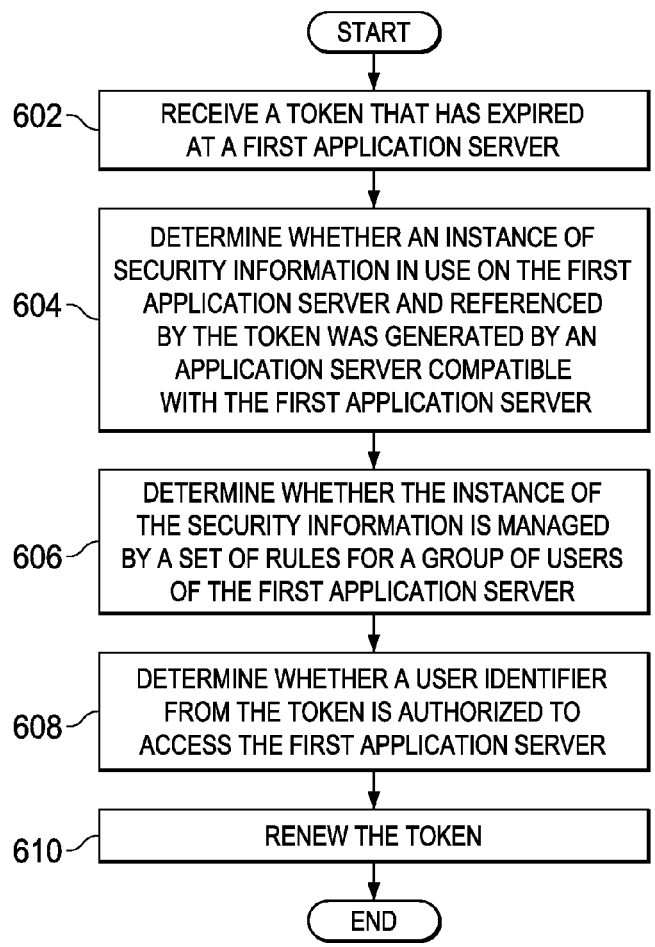
FIG. 4 is an illustration of a security token in accordance with an illustrative embodiment.
FIG. 5 is an illustration of a subject in accordance with an illustrative embodiment.
FIG. 6 is a flowchart of a process for managing user identification information in accordance with an illustrative embodiment.

With reference now to FIG. 4, an illustration of a security token is depicted in accordance with an illustrative embodiment. In this illustrative example, security token 400 is an example of one embodiment of security token 310 in FIG. 3.

Security token 400 includes user ID 402. User ID 402 is unique identification information for identifying a user. User ID 402 may also be used to identify a session for the user. Security token 400 also includes expiration time 404. In this example, security token 400 will expire on Jun. 15, 2011 at 2:30 p.m. Eastern Daylight Time.

Security token 400 may be reissued after it expires. For example, an authentication system, such as, for example, authentication system 308 in FIG. 3, may generate a new security token containing user ID 402. However, expiration time 404 will be modified to be a time in the future when the new security token will expire. Security token 400 may also be encrypted by a key known only to the authentication system. Thus, only the authentication system would be able to extract the contents of security token 400.

With reference now to FIG. 5, an illustration of a subject is depicted in accordance with an illustrative embodiment. In this illustrative example, subject 500 is an example of security information 328 in FIG. 3.

Subject 500 is a representation of a user. Subject 500 contains information about a user principal. In Java™ programming language, a user principal is a user name or account name. Subject 500 may have multiple principals. Line 502 is an example of code for retrieving the principals for subject 500. Subject 500 contains information about user credentials. Credentials are permissions of the principals. Line 504 is an example of code for retrieving the credentials for subject 500.

The illustrations of security token 400 in FIG. 4 and subject 500 in FIG. 5 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, custom information may be included in security token 400. In other examples, security token 400 may include information for identifying transactions being processed at the application server. In other illustrative embodiments, subject 500 may include passwords and encryption keys.

With reference now to FIG. 6, an illustration of a flowchart of a process for managing user identification information is depicted in accordance with an illustrative embodiment. The process illustrated in FIG. 6 may be implemented by authentication process 216 in FIG. 2. The process also may be implemented in application server 300 in FIG. 3.

The process begins by receiving a token that has expired at a first application server (step 602). In step 602, the token was in a request received at the first application server. The process then determines whether an instance of security information in use on the first application server and referenced by the token was generated by an application server compatible with the first application server (step 604). In step 604, the application server may be compatible with the first application server, if the application server is a same type of application server as the first application server. The application server may be compatible with the first application server, if the application server is a same version of application server as the first application server.

Thereafter, the process determines whether the instance of the security information is managed by a set of rules for a group of users of the first application server (step 606). In step 606, the set of rules for the group of users may be a security realm of the first application server. The process checks whether the instance of the security information uses the same security realm as the first application server. The process then determines whether a user identifier from the token is authorized to access the first application server (step 608). In step 608, the process searches the user identification information to determine whether the user identifier is still valid. Thereafter, the process renews the token (step 610), with the process terminating thereafter. In step 610, the process renews the token by generating a new token that is valid.

Figure 7:
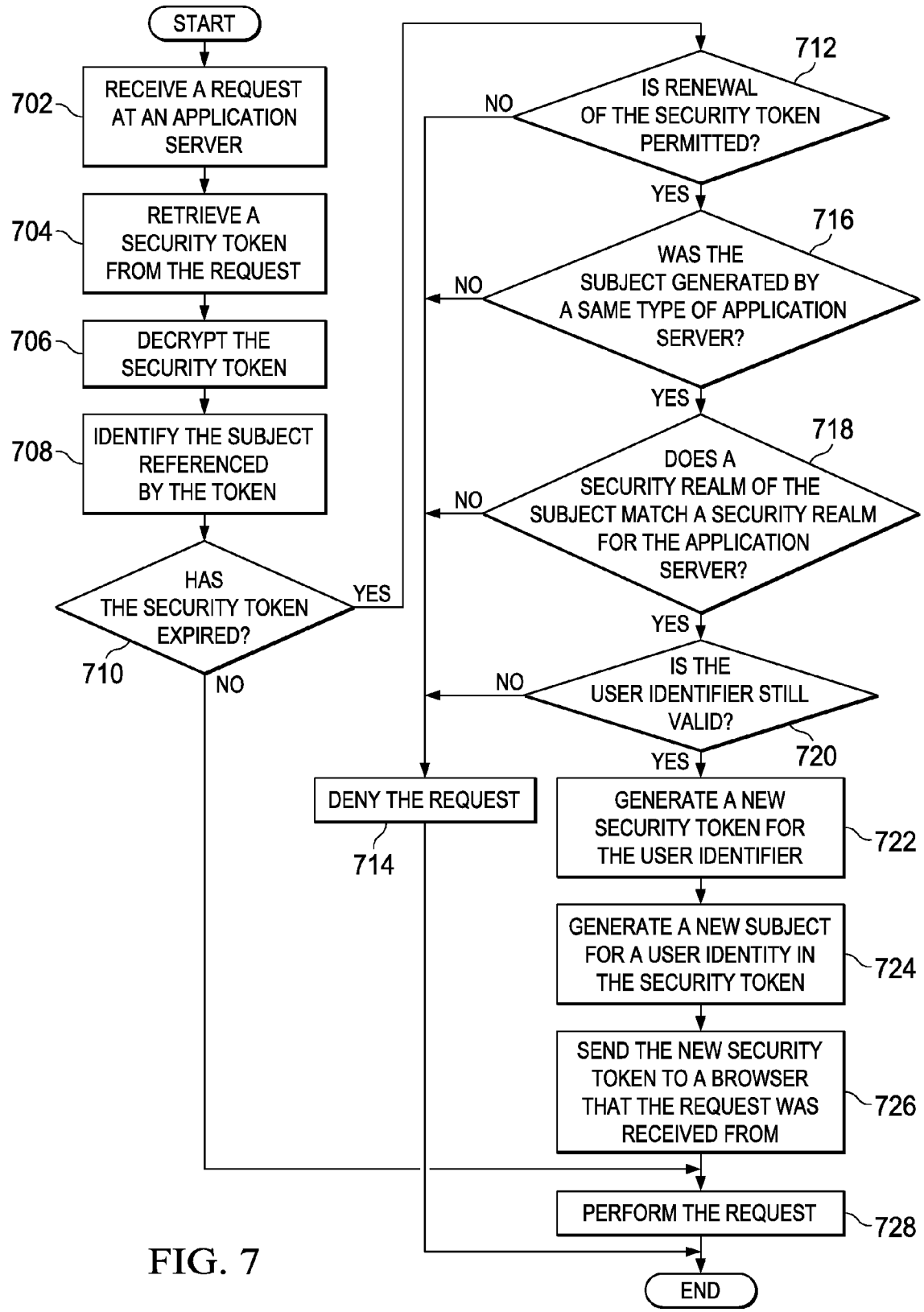
FIG. 7 is a flowchart of a process for generating a new token for a user in accordance with an illustrative embodiment.

With reference now to FIG. 7, an illustration of a flowchart of a process for generating a new token for a user is depicted in accordance with an illustrative embodiment. The process illustrated in FIG. 7 may be implemented by authentication process 216 in FIG. 2. The process also may be implemented in application server 300 in FIG. 3.

The process begins by receiving a request at an application server (step 702). In step 702, the request may be a request to perform a transaction by an application in the application server. The process then retrieves a security token from the request (step 704). Thereafter, the process decrypts the security token (step 706). The process then identifies the subject referenced by the token (step 708). In step 708, the process searches security information stored for the application server for an instance of the security information for a user identifier in the token.

Thereafter, the process determines whether the security token has expired (step 710). If the process determines that the security token has not expired, the process proceeds to step 728, discussed below. If the process determines that the security token has expired, the process determines whether renewal of the security token is permitted (step 712). In step 712, renewal may be controlled by an administrator. If the process determines that renewal of the security token is not permitted, the process denies the request (step 714), with the process terminating thereafter.

If, however, at step 712, the process determines that renewal of the security token is permitted, the process determines whether the subject was generated by a same type of application server (step 716). In step 716, the same type of application server is the same type as the application server that received the request. In one example, the application server that received the request may be the same application server that generated the subject. If the process determines that the subject was not generated by a same type of application server, the process proceeds to step 714 and denies the request.

If, however, the process determines that the subject was generated by a same type of application server, the process determines whether a security realm of the subject matches a security realm for the application server (step 718). If the process determines that the security realm of the subject does not match the security realm for the application server, the process proceeds to step 714 and denies the request. If, however, the process determines that the security realm of the subject matches the security realm for the application server, the process determines whether the user identifier is still valid (step 720). If the process determines that the user identifier not valid, the process proceeds to step 714 and denies the request.

If, however, the process determines that the user identifier is still valid, the process generates a new security token for the user identifier (step 722). In step 722, the new security token will be valid for a period of time in the future. The process then generates a new subject for a user identity in the security token (step 724). In step 724, the new subject may include updated security information about the user identifier. Thereafter, the process sends the new security token to a browser that the request was received from (step 726). The process then performs the request (step 728), with the process terminating thereafter.

Figure 8:
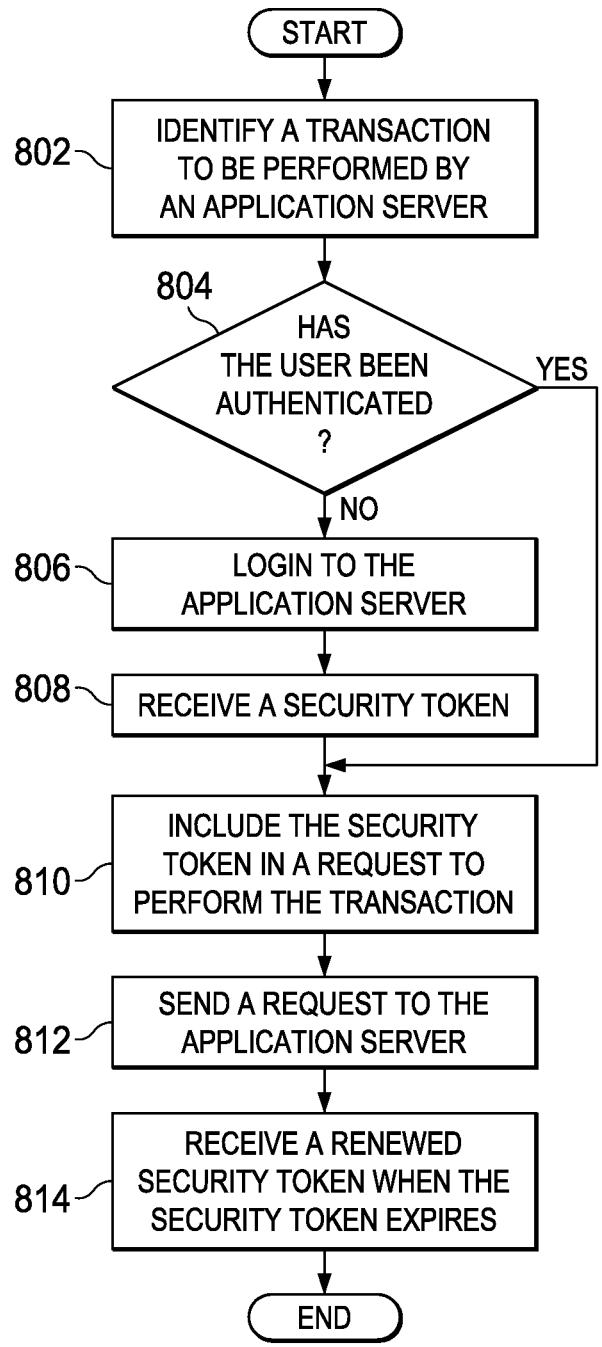
FIG. 8 is a flowchart of a process for sending requests to an application server in accordance with an illustrative embodiment.

With reference now to FIG. 8, an illustration of a flowchart of a process for sending requests to an application server is depicted in accordance with an illustrative embodiment. The process illustrated in FIG. 8 may be implemented by browser 207 in client computer 202 in FIG. 2.

The process begins by identifying a transaction to be performed by an application server (step 802). The process then determines whether the user has been authenticated (step 804). In step 804, the process may send a message to the application server and receive a request to login to the application server. If the process determines that the user has been authenticated, the process proceeds to step 810, discussed below.

If, however, the process determines that the user has not been authenticated, the process logs in to the application server (step 806). In step 806, a user may need to enter a user identifier and password to a browser. The browser may send the user identifier and password to the application server for authentication.

Thereafter, the process receives a security token (step 808). The process then includes the security token in a request to perform the transaction (step 810). Thereafter, the process sends a request to the application server (step 812). The process then receives a renewed security token when the security token expires (step 814), with the process terminating thereafter. In step 814, the process receives the renewed security token after the previous security token expired and without the user having to re-authenticate to the application server.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 9, an illustration of a block diagram of a data processing system is depicted in accordance with an illustrative embodiment. In this illustrative example, data processing system 900 includes communications fabric 902, which provides communications between processor unit 904, memory 906, persistent storage 908, communications unit 910, input/output (I/O) unit 912, and display 914. In these illustrative examples, data processing system 900 is an example of one implementation of set of data processing systems 302 in FIG. 3. Data processing system 900 is also one example of client computer 202 in FIG. 2.

Processor unit 904 serves to process instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for processing by processor unit 904. The processes of the different embodiments may be performed by processor unit 904 using computer implemented instructions, which may be located in a memory, such as memory 906.

These instructions are referred to as program code, computer usable program code, or computer readable program code that may be read and processed by a processor in processor unit 904. The program code in the different embodiments may be embodied on different physical or tangible computer readable media, such as memory 906 or persistent storage 908.

Program code 918 is located in a functional form on computer readable media 920 that is selectively removable and may be loaded onto or transferred to data processing system 900 for processing by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these illustrative examples, computer readable storage media 924 is a non-transitory computer readable storage medium.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

Storage devices 916 are examples of implementations of set of storage devices 324 in FIG. 3. Further, program code 918 may include program code for authenticating users and renewing security tokens, such as, for example, authentication process 216 in FIG. 2 and authentication process 312 in FIG. 3.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

As another example, a storage device in data processing system 900 is any hardware apparatus that may store data. Memory 906, persistent storage 908, and computer readable media 920 are examples of storage devices in a tangible form.

The different illustrative embodiments recognize and take into account that it may be desirable to renew security tokens for a user without the user having to re-authenticate. Re-authentication may cost the user time and may affect the performance of long running transactions. While renewal of the security token may present security issues, the different illustrative embodiments provide methods and procedures for ensuring security and compatibility.

The different illustrative embodiments generate new security tokens for users and allow the user requests to be processed without additional input required from the user. Further, different illustrative embodiments check and update security information of the users in renewing the security token. Keeping updated information in the subject can improve security and reduce errors from inconsistent information.

Additionally, allowing renewal of security information may also provide additional security features. For example, if a user's authentication information had been comprised and the token expired, an unauthorized user may be able to obtain a valid security token and gain access to the application server using the compromised information. However, in determining whether to renew security tokens, the different illustrative embodiments review the security information for the user. If the security information for the user indicates that the user's authentication information had been comprised, the user identifier would no longer be valid and the token would not be reissued.

Thus, the illustrative embodiments provide a computer implemented method, data processing system, and computer program product for managing user identification information. A determination is made whether an instance of security information in use on the first application server and referenced by a token that has expired was generated by an application server compatible with a first application server in response to receiving the token at the first application server. A determination is made whether the instance of the security information is managed by a set of rules for a group of users of the first application server in response to determining that the instance of the security information was generated by an application server compatible with the first application server. A determination is made whether a user identifier from the token is authorized to access the first application server in response to determining that the instance of the security information referenced by the token is managed by the set of rules for the group of users of the first application server. The token is renewed in response to determining that the user identifier is authorized to access the first application server.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method operative in association with a first application server for managing user identification information, the method comprising:
responsive to receiving, at the first application server, a token that has expired, the token received from a client that is distinct from the first application server, determining, by a processor unit having a hardware element, whether an instance of security information in use on the first application server and referenced by the token was generated by an application server compatible with the first application server, wherein a determination regarding compatibility is based on whether the first application server is of a same type or version as the application server that generated the instance of security information;
responsive to determining that the instance of the security information was generated by an application server compatible with the first application server, determining whether the instance of the security information is managed using a set of rules for a group of users of the first application server;
responsive to determining that the instance of the security information referenced by the token is managed by the set of rules for the group of users of the first application server, determining whether a user identifier from the token is authorized to access the first application server; and
responsive to determining that the user identifier is authorized to access the first application server, renewing the token.

2. The method of claim 1, wherein renewing the token comprises:
generating a new token for the user identifier; and
sending the new token to a browser that the token was received from.

3. The method of claim 1 further comprising:
receiving the token in a request during a session at the first application server;
responsive to receiving the request, identifying the user identifier from the token; and
identifying the instance of the security information in use on the first application server using the user identifier, wherein the instance of the security information is a current instance of the security information for the session in use by a server application running in the first application server and wherein the security information is of a user associated with the user identifier.

4. The method of claim 1 further comprising:
receiving the token in a request at the first application server;
responsive to determining that the user identifier is authorized to access the first application server, store updated security information about a user associated with the user identifier at the first application server; and
performing the request at the first application server using the updated security information without requiring the user to authenticate after the token has expired.

5. The method of claim 1 further comprising:
receiving the token in a request at the first application server;
responsive to determining that the token has expired, determining whether renewal of the token is permitted for the first application server;
responsive to determining that renewal of the token is not permitted for the first application server, denying the request at the first application server; and
wherein determining whether the instance of the security information in use on the first application server and referenced by the token was generated by an application server compatible with the first application server comprises:
determining whether the instance of the security information in use on the first application server and referenced by the token was generated by an application server compatible with the first application server in response to determining that renewal of the token is permitted for the first application server.

6. The method of claim 1 further comprising:
receiving the token in a request at the first application server;
determining whether the request was received at the first application server during a period of time that the token is valid; and
wherein renewing the token comprises: generating a new token where the period of time the new token is valid to includes a present time.

7. The method of claim 1, wherein the set of rules for the group of users of the first application server is a security realm of the first application server and wherein determining whether the instance referenced by the token is managed by the set of rules for the group of users of the first application server comprises:
determining whether the instance of the security information uses the security realm of the first application server.

8. The method of claim 1, wherein determining whether the instance of the security information in use on the first application server and referenced by the token was generated by an application server compatible with the first application server comprises:
determining whether the application server that generated the token is a same type of application server as the first application server.

9. The method of claim 1, wherein the token is encrypted information comprising the user identifier sent to a browser after a user has been authenticated.

10. An application server for managing user identification information, the application server comprising:
an authentication system configured to receive a token that has expired in a request, the request received from a client that is distinct from the application server, determine whether an instance of security information in use on the application server and referenced by the token was generated by a type or version of application server that is compatible with the application server, determine whether the instance of the security information is managed by a set of rules for a group of users of the application server in response to determining that the instance of the security information was generated by the type of application server that is compatible with the application server, determine whether a user identifier from the token is authorized to access the application server in response to determining that the instance of the security information referenced by the token is managed by the set of rules for the group of users of the application server, and renew the token in response to determining that the user identifier is authorized to access the application server.

11. The application server of claim 10 further comprising:
a storage device configured to store updated security information about a user associated with the user identifier in response to the authentication system determining that the user identifier is authorized to access the application server; and a data processing system associated with the storage device, the data processing system configured to perform the request using the updated security information without the authentication system requiring the user to authenticate after the token expired.

12. The application server of claim 10, wherein in renewing the token the authentication system is further configured to generate a new token for the user identifier and send the new token to a browser that the token was received from.

13. The application server of claim 10, wherein the authentication system is further configured to identify the user identifier from the token and identify the instance of the security information in use on the application server using the user identifier, wherein the instance of the security information is a current instance of the security information for a session in use by a server application running in the application server and wherein the security information is of a user associated with the user identifier.

14. A computer program product for managing user identification information in association with a first application server, the computer program product comprising:
a non-transitory computer readable storage medium;
program code, stored on the computer readable storage medium, configured to determine whether an instance of security information in use on the first application server and referenced by a token that has expired was generated by an application server compatible with the first application server in response to receiving the token at the first application server from a client that is distinct from the first application server, wherein a determination regarding compatibility is based on whether the first application server is of a same type or version as the application server that generated the instance of security information;
program code, stored on the computer readable storage medium, configured to determine whether the instance of the security information is managed by a set of rules for a group of users of the first application server in response to determining that the instance of the security information was generated by an application server compatible with the first application server;
program code, stored on the computer readable storage medium, configured to determine whether a user identifier from the token is authorized to access the first application server in response to determining that the instance of the security information referenced by the token is managed by the set of rules for the group of users of the first application server; and
program code, stored on the computer readable storage medium, configured to renew the token in response to determining that the user identifier is authorized to access the first application server.

15. The computer program product of claim 14, wherein the program code configured to renew the token comprises:
program code, stored on the computer readable storage medium, configured to generate a new token for the user identifier; and
program code, stored on the computer readable storage medium, configured to send the new token to a browser that the token was received from.

16. The computer program product of claim 14 further comprising:
program code, stored on the computer readable storage medium, configured to receive the token in a request during a session at the first application server;
program code, stored on the computer readable storage medium, configured to identify the user identifier from the token in response to receiving the request; and
program code, stored on the computer readable storage medium, configured to identify the instance of the security information in use on the first application server using the user identifier, wherein the instance of the security information is a current instance of the security information for the session in use by a server application running in the first application server and wherein the security information is of a user associated with the user identifier.

17. The computer program product of claim 14 further comprising:
program code, stored on the computer readable storage medium, configured to receive the token in a request at the first application server;
program code, stored on the computer readable storage medium, configured to store updated security information about a user associated with the user identifier at the first application server in response to determining that the user identifier is authorized to access the first application server; and
program code, stored on the computer readable storage medium, configured to perform the request at the first application server using the updated security information without requiring the user to authenticate after the token has expired.

18. The computer program product of claim 14,
wherein the set of rules for the group of users of the first application server is a security realm of the first application server and wherein the program code configured to determine whether the instance referenced by the token is managed by the set of rules for the group of users of the first application server comprises:
program code, stored on the computer readable storage medium, configured to determine whether the instance of the security information uses the security realm of the first application server.

19. The computer program product of claim 14,
wherein the computer readable storage medium is in a data processing system, and the program code is downloaded over a network from a remote data processing system to the computer readable storage medium in the data processing system.

20. The computer program product of claim 18,
wherein the computer readable storage medium is a first computer readable storage medium, wherein the first computer readable storage medium is in a server data processing system, and wherein the program code is downloaded over a network to a remote data processing system for use in a second computer readable storage medium in the remote data processing system.

21. A data processing system operative in association with a first application server for managing user identification information, the data processing system comprising:
a bus system;
a storage device connected to the bus system, wherein the storage device includes program code; and a processor unit connected to the bus system, wherein the processor unit is configured to determine whether an instance of security information in use on the first application server and referenced by a token that has expired was generated by an application server compatible with the first application server in response to receiving the token at the first application server from a client distinct from the first application server, determine whether the instance of the security information is managed by a set of rules for a group of users of the first application server in response to determining that the instance of the security information was generated by an application server compatible with the first application server, determine whether a user identifier from the token is authorized to access the first application server in response to determining that the instance of the security information referenced by the token is managed by the set of rules for the group of users of the first application server, and renew the token in response to determining that the user identifier is authorized to access the first application server, wherein a determination regarding compatibility is based on whether the first application server is of a same type or version as the application server that generated the instance of security information.

22. The data processing system of claim 21, wherein, in executing the program code to renew the token, the processor unit is further configured to generate a new token for the user identifier, and send the new token to a browser that the token was received from.

23. The data processing system of claim 21, wherein the processor unit is further configured to receive the token in a request during a session at the first application server, identify the user identifier from the token in response to receiving the request, and identify the instance of the security information in use on the first application server using the user identifier, wherein the instance of the security information is a current instance of the security information for the session in use by a server application running in the first application server and wherein the security information is of a user associated with the user identifier.

24. The data processing system of claim 21, wherein the processor unit is further configured to receive the token in a request at the first application server, store updated security information about a user associated with the user identifier at the first application server in response to determining that the user identifier is authorized to access the first application server, and perform the request at the first application server using the updated security information without requiring the user to authenticate after the token has expired.

25. The data processing system of claim 21, wherein the set of rules for the group of users of the first application server is a security realm of the first application server and wherein, in executing the program code to determine whether the instance referenced by the token is managed by the set of rules for the group of users of the first application server, the processor unit is further configured to determine whether the instance of the security information uses the security realm of the first application server.

* * * * *